(12) United States Patent
Goeson

(10) Patent No.: US 7,987,563 B2
(45) Date of Patent: Aug. 2, 2011

(54) ZIPPER CORD

(76) Inventor: Blaine B Goeson, Calgary (CA)

(*) Notice: Subject to any disclaimer, the term of this patent is extended or adjusted under 35 U.S.C. 154(b) by 877 days.

(21) Appl. No.: 12/008,239

(22) Filed: Jan. 8, 2008

(65) Prior Publication Data

US 2009/0172925 A1 Jul. 9, 2009

(51) Int. Cl.
*A44B 99/00* (2010.01)
*A44B 11/00* (2010.01)

(52) U.S. Cl. .............. 24/302; 24/300; 411/118

(58) Field of Classification Search ............ 24/298, 24/300, 302; 410/96, 117, 118, 156, 129; 211/113, 118, 119, 119.1, 119.12; 160/300, 160/332, 350
See application file for complete search history.

(56) References Cited

U.S. PATENT DOCUMENTS

| | | | | |
|---|---|---|---|---|
| 2,854,931 | A * | 10/1958 | Campbell | 410/118 |
| 4,986,389 | A * | 1/1991 | Halligan et al. | 160/368.1 |
| 5,035,558 | A | 7/1991 | Prosen | |
| 5,366,327 | A | 11/1994 | Nelson | |
| 5,381,589 | A | 1/1995 | Bailey | |
| 5,440,790 | A * | 8/1995 | Chou | 24/302 |
| D389,728 | S | 1/1998 | Fitzwater | |
| D411,099 | S | 6/1999 | Smith | |
| 6,012,590 | A * | 1/2000 | Sanchez | 211/113 |
| 6,292,984 | B1 | 9/2001 | Nelson | |

* cited by examiner

*Primary Examiner* — Robert J Sandy

(57) ABSTRACT

A load-securing device having (a) a rope having a first end and second end; (b) multiple hooks, wherein the hook has a first end and a second end, the first end of the hook forms a loop around the rope where the hook can slide along the rope but cannot be removed from the rope, the second end of the hook forms a C-shape; and (c) a first stopper attached to the first end of the rope and a second stopper attached to the second end of the rope, the stoppers being effective to prevent the hooks from sliding off the rope.

1 Claim, 4 Drawing Sheets

ZIPPER CORD

BACKGROUND OF THE INVENTION

The load-securing device ("zipper cord") of the present invention can be used to prevent furniture or heavy appliances from shifting or falling while being transported in a transporting vehicle (e.g., a truck). The appealing features of the present device would be its safety and convenience, as well as versatility.

DESCRIPTION OF PREFERRED EMBODIMENTS

Figure 1:
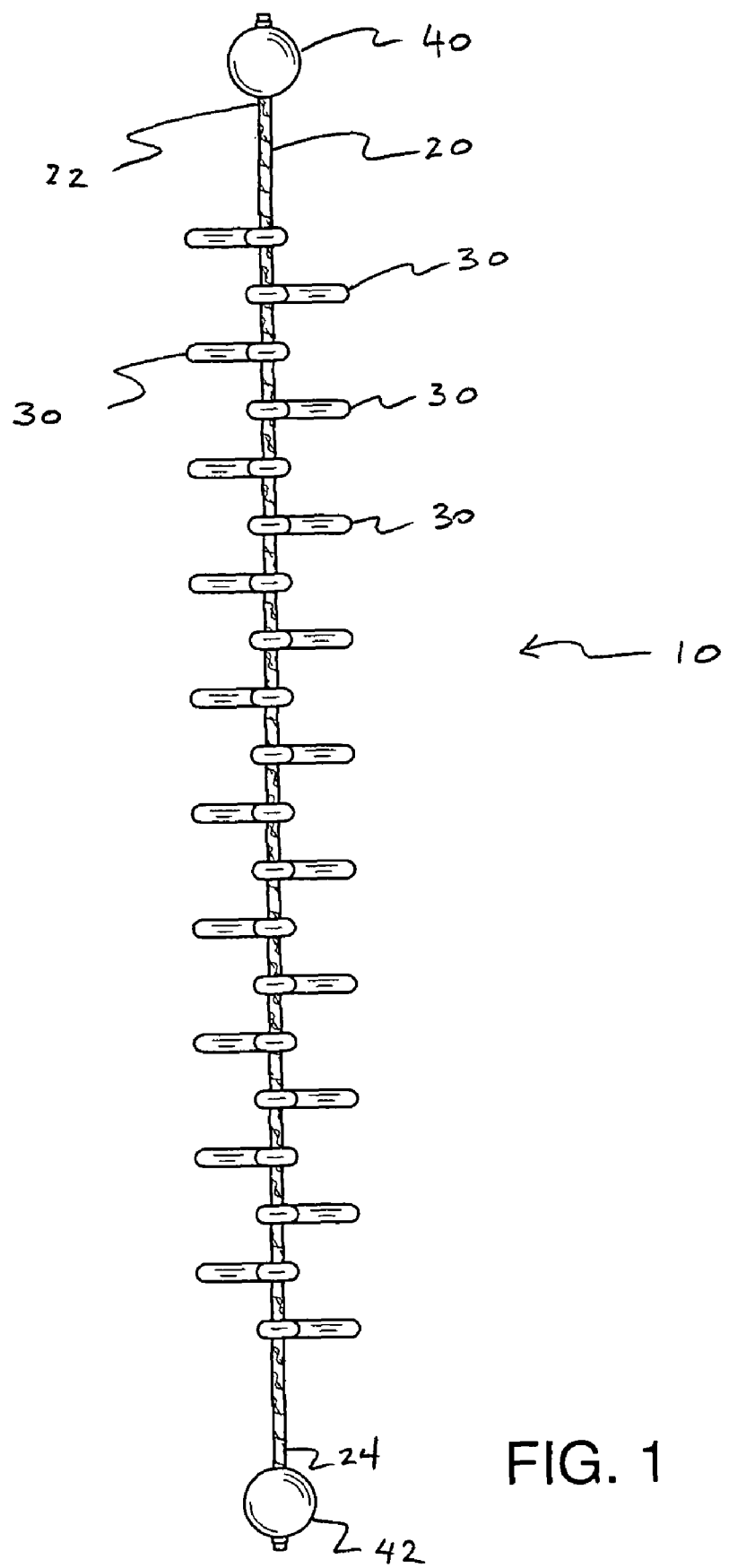
FIG. 1 shows a rope having multiple hooks, wherein the stoppers at the end of the rope prevent the hooks from sliding off the rope.
Figure 2:
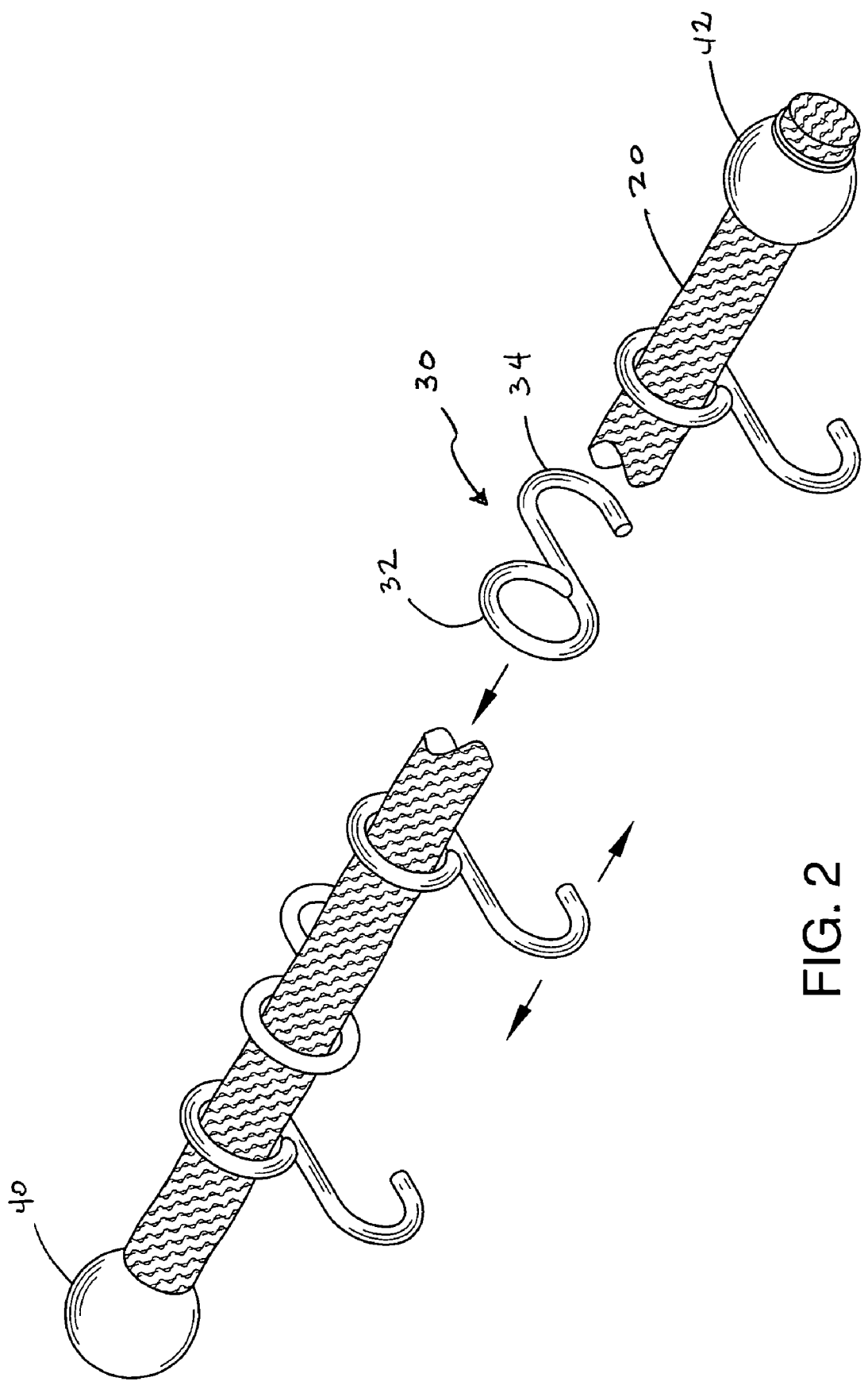
FIG. 2 shows a perspective view of the present device, wherein the hooks (e.g., S-hooks) are secured to the rope and are free to slide along the length of the rope.

The present invention features a load-securing device 10 comprising (a) a rope 20 having a first end 22 and second end 24 (see FIG. 1); (b) multiple of hooks 30, wherein the hook has a first end 32 and a second end 34, the first end 32 of the hook forms a loop around the rope 20 where the hook can slide along the rope but cannot be removed from the rope 20, the second end of the hook forms a C-shape 34 (see FIG. 2); and (c) a first stopper 40 attached to the first end 22 of the rope 20 and a second stopper 42 attached to the second end 24 of the rope 20, the stoppers being effective to prevent the hooks 30 from sliding off the rope 20.

In some embodiments, the rope 20 is about 10 to 30 feet long, preferably 25 feet long. As used herein, the term "about" means plus or minus 10% of the reference number. In some embodiments, the diameter of the rope 20 is about ⅛ inch to about ⅝ inch, preferably about ⅜ inch. The rope 20 may be constructed from any material. In some embodiments, the rope 20 is constructed from a rot-resistant material. In some embodiments, the rope 20 is constructed from non-elastic nylon. In some embodiments, the rope 20 is not elastic such that it can snap and causes injury to workers. For example, a rope 20 of the present invention does not comprises a bungee cord (a bungee cord is an elastic cord composed of one or more elastic strands forming a core, covered in a woven sheath usually of nylon or cotton. More recently, specialized bungee jumping cords are made entirely of elastic strands.) As used herein, a non-elastic rope is one that cannot be stretched beyond 5% of its original length without completely tearing the rope into two or more parts. For example, a non-elastic rope of 100 feet cannot be stretched beyond 105 feet without completely tearing the rope into two or more parts. In some embodiments, a rope of the present invention is constructed from, for example, natural fibers such as Manila hemp, hemp, linen, cotton, coir, jute, and sisal. Synthetic fibers in use for rope-making include polypropylene, nylon, polyesters (e.g. PET®, Vectran®), polyethylene (e.g. Spectra®) and Aramids® (e.g. Twaron®, Technora® and Kevlar®). In some embodiments, the ropes are constructed of mixtures of several fibres or use co-polymer fibres. Ropes of the present invention can also be made out of metal fibers.

In some embodiments, the hooks are eyehooks or S-hooks. As used herein, an "S-hook" has a shape that is shown FIG. 2, i.e., a hook having an S-shape. In some embodiments, the number of hooks 30 slide-ably attached to the rope 20 is about 20 hooks to about every 25 feet of rope. For example, for a 25-foot rope 20, there would be 20 hooks; for a 50-foot rope, 20 there would be 40 hooks, etc. In some embodiments, the hooks are constructed from a rigid/sturdy material (including plastic, metal, alloy, and the like). In some embodiments, the hook is an eyehook and is about 2.5 inches from the first end 32 to the second end 34 of the hook 30.

In some embodiments, the first stopper 40 and second stopper 42 are secured to the first end of the rope 22 and second end of the rope 24, respectively, through any conventional means (glue, tying, clamping, and the like). The stoppers are effective in preventing the hooks 30 from sliding off the rope 20. In some embodiments, the first and second stoppers 40/42 are rubber balls.

Figure 3:
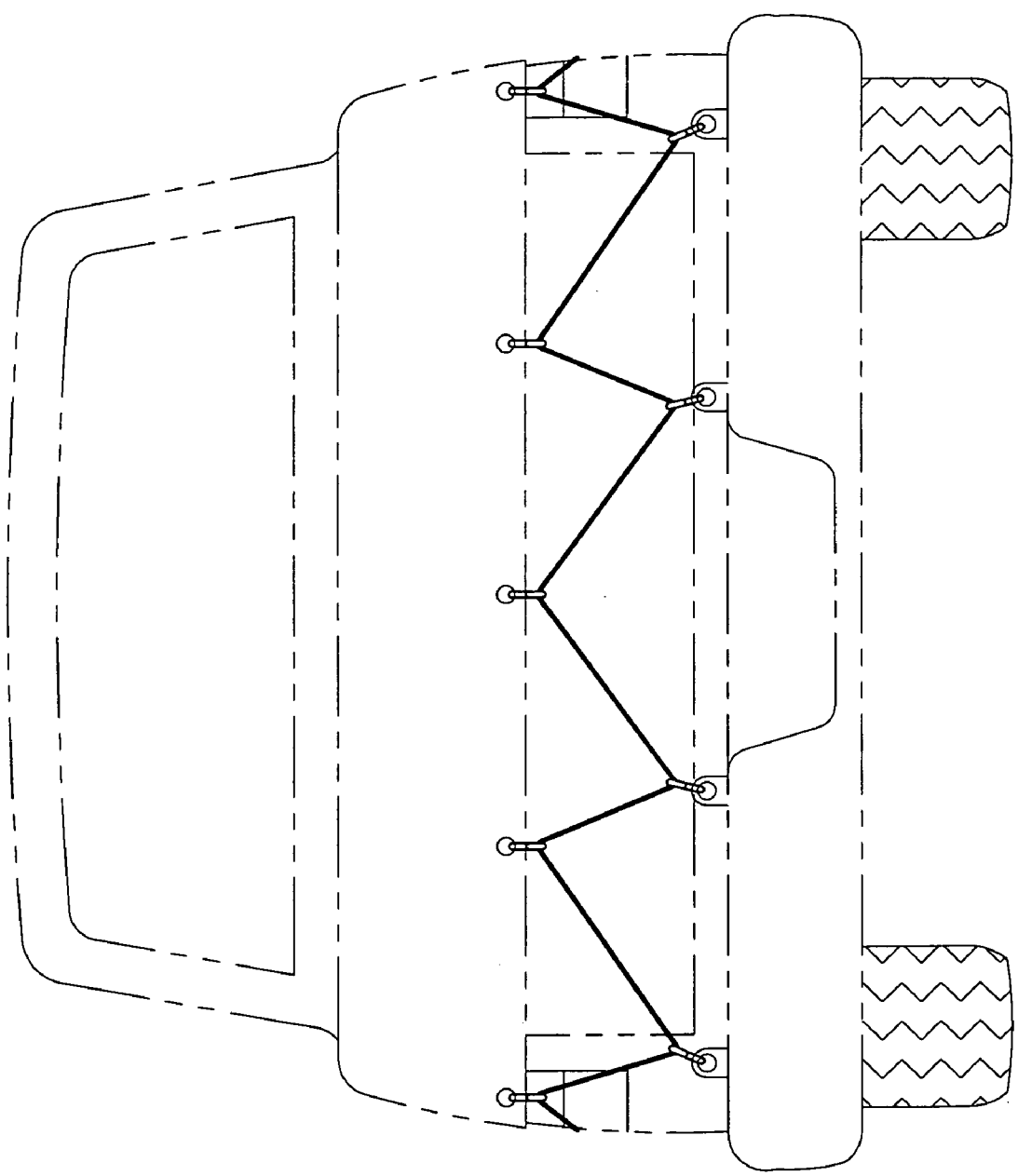
FIG. 3 shows the present load-securing device being used to hold down a tarp through the tarp's eyelets.
Figure 4:
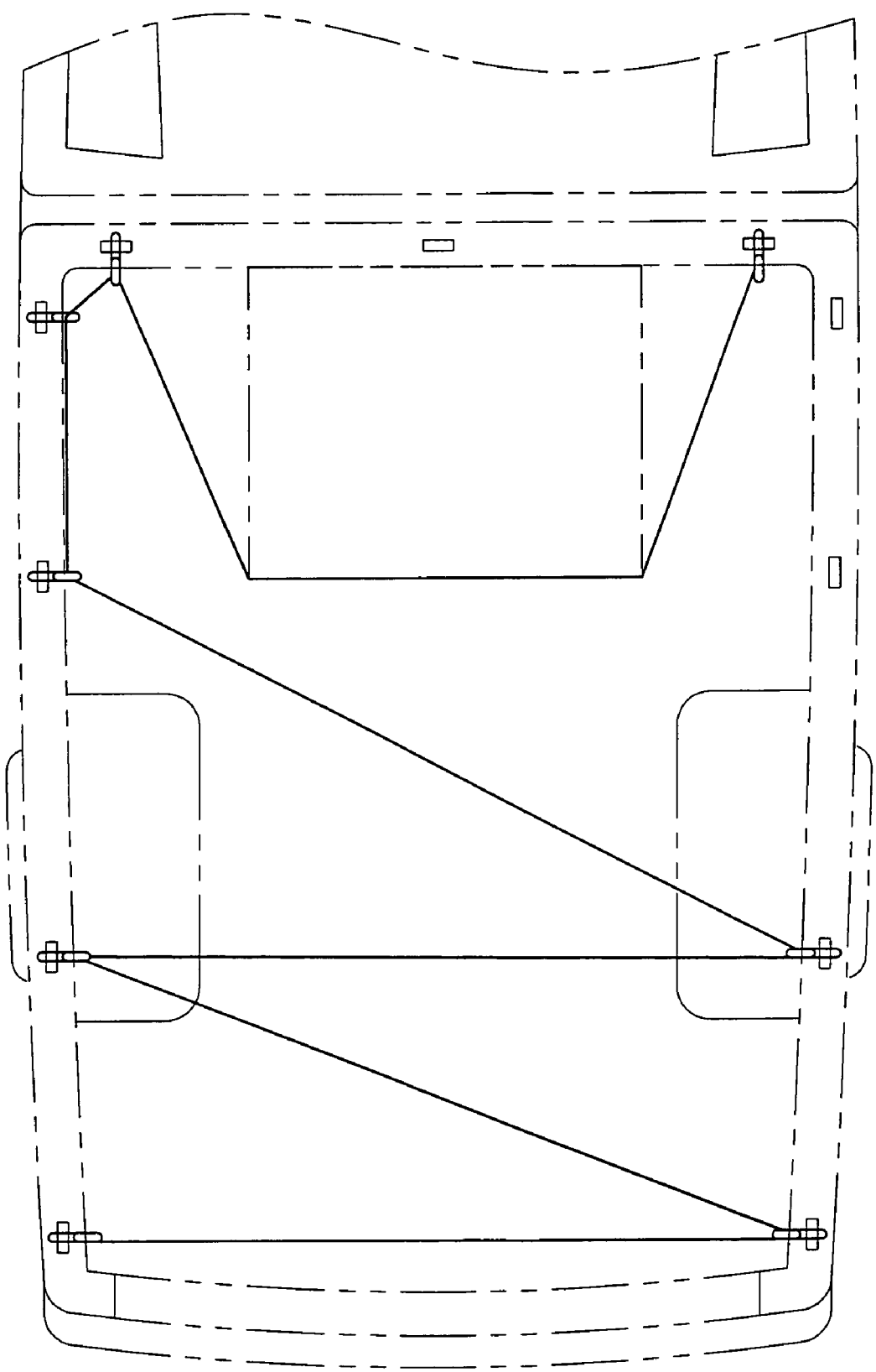
FIG. 4 shows the present load-securing device being lashed back and forth over the top of a truck.

The present invention may be used in a wide range of applications. For example, it can be used to safely stabilize loads for transport and also protect tarps from tearing at eyelets. In some embodiments, the rope 20 could be used by itself by lashing back and forth over and around a load or an article to be secured to a vehicle or base of any sort. One would attach the first hook (e.g., eyehook or S-hook) to the outer edge of the vehicle or base and then pull it over and around the load for attachment of the next hook to the outer edge on the other side of the vehicle or base (see FIGS. 3 and 4). This process would be repeated back and forth across the load until it was properly secured for transportation. Using the present invention in this manner would create a crisscross effect holding the load down. With the hooks 30 sliding along the rope 20, they would be precisely positioned and used for securing the load in the best possible manner, regardless of the size and shape of the article to be secured.

In some embodiments, the present invention may also be used with a tarpaulin to lash the edges down by hooking the hooks (e.g., eyehooks or S-hooks) of the rope 20 to the eyelets of the tarp in zigzag fashion to the edges of the vehicle or base the load was positioned upon. The vehicle's bumper, pickup box side, or roof strapping could all be used to secure the rope. If added strength was needed, two or more hooks could be used in each tarp eyelet.

In some embodiments, on a construction site, the present invention can provide a partial or portable rail for the construction worker on a scaffold, or provide a marking for a boundary of an open excavation site to prevent anyone from falling into the hole.

In some embodiments, while working on a motor vehicle, the present invention may be used to hold a transmission or drive shaft while the mechanic bolts the part into place. In some embodiments, if the vehicle's hood latch is sprung, it can be used to hold the hood down in place until the driver reaches a repair shop.

In some embodiments, when camping, the present invention may be used to lash or hold down the tarps that one erects as a shelter from the rain or protection or shade from the sun. By lashing in an up-and-down pattern from each eyelet in the tarp to a stake in the ground, the tarp will not whip in the wind and will remain secure. A tarp could be lashed vertically to a tree to provide a windbreak or wall for one's campsite. The rope 20 can be strung between two poles or trees and be used as laundry line, using the hooks 30 to hand cloths or shoes to dry.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety. Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A load-securing device comprising:
   (a) a rope having a first end and second end, wherein the rope is non-elastic;
   (b) multiple hooks, wherein each hook has a first end and a second end; the first end of each hook forms a loop around the rope where the hook can slide along the rope but cannot be removed from the rope, the second end of each hook forms a C-shape, wherein each hook has an S-shape; and
   (c) a first stopper attached to the first end of the rope and a second stopper attached to the second end of the rope, each stopper being effective to prevent the hooks from sliding off the rope.

* * * * *